United States Patent [19]

Briet

[11] Patent Number: 4,718,636
[45] Date of Patent: Jan. 12, 1988

[54] BRANCH COUPLING ON FLEXIBLE HOSE
[75] Inventor: Gilles Briet, Gueugnon, France
[73] Assignee: Hutchinson, Paris, France
[21] Appl. No.: 923,144
[22] PCT Filed: Feb. 13, 1986
[86] PCT No.: PCT/FR86/00042
   § 371 Date: Oct. 27, 1986
   § 102(e) Date: Oct. 27, 1986
[87] PCT Pub. No.: WO86/04972
   PCT Pub. Date: Aug. 28, 1986

[30] Foreign Application Priority Data

Feb. 14, 1985 [FR] France ............................ 85 02097

[51] Int. Cl.$^4$ ............................................. F16K 51/00
[52] U.S. Cl. .................................... 251/145; 251/216;
                                                251/217; 251/339
[58] Field of Search ............... 251/145, 216, 217, 339,
                                                251/351

[56] References Cited

U.S. PATENT DOCUMENTS

| Re. 28,844 | 6/1976 | Dehar ................................ 251/217 |
| 2,824,570 | 2/1958 | Silverman et al. ................. 251/216 |
| 3,104,136 | 5/1960 | Merriman .......................... 308/237 |
| 3,272,904 | 1/1961 | Millard .............................. 264/275 |
| 4,487,392 | 11/1984 | Eckenrode, Jr. ................. 251/216 |

FOREIGN PATENT DOCUMENTS

| 26903 | 3/1970 | Australia . |
| 2075581 | 10/1971 | France . |
| 2445479 | 7/1980 | France . |
| 2506892 | 12/1982 | France . |
| 1494473 | 12/1977 | United Kingdom . |
| 203437 | 7/1980 | United Kingdom . |

Primary Examiner—A. Michael Chambers
Attorney, Agent, or Firm—Browdy and Neimark

[57] ABSTRACT

Purge branch coupling for a main flexible hose, reinforced or not, sheathed or unsheathed, of the type having the shape of a tubular insert which is intended to co-operate with a closure piece of its proximal extremity and which is integral with the main hose by moulding coating of a splicing material, particularly comprised of plastic or elastomer material. According to this invention, the tubular insert forming the purge branch coupling comprises a plurality of openings provided in its tubular wall so that the coating of said junction material, which penetrates into said openings during moulding establishes linking bridges between the portions of said coating which envelope the insert, thus providing for the holding in position of said insert. Application for couplings in lines of water, air and fuel circuits in motor vehicles.

11 Claims, 5 Drawing Figures

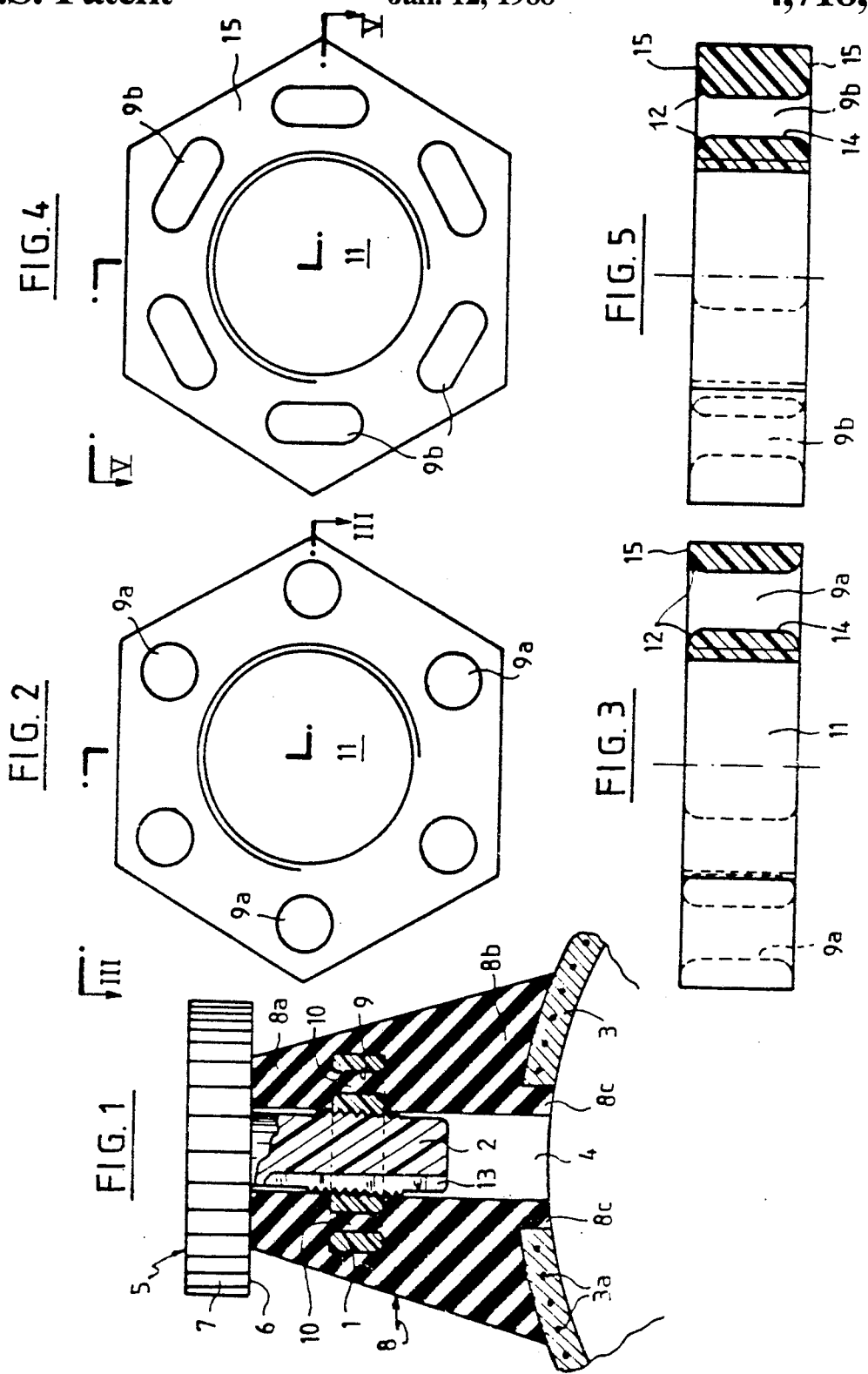

BRANCH COUPLING ON FLEXIBLE HOSE

BACKGROUND OF THE INVENTION

1. Field of the Invention

The present invention relates to a branch connection, and in particular a drain branch connection in a main flexible pipe, reinforced or not, sheathed or not.

2. Description of the Prior Art

The French patent application No. 81 10769 describes a branch connection whose distal end is preferably separated from the wall of the main pipe or at most in contact therewith, so as to protect the armature of the connection and/or of the main pipe by penetration of a coating of a junction material, shaped by molding, between the branch orifice formed in the main pipe and the connection.

This connection is formed particularly when it is a question of a drain connection, by a tubular insert embedded at least partially in said coating of junction material.

Before molding this coating, a binding material is applied (by spraying or by immersion or similar) to at least the parts of the insert intended to be coated with said junction material, more particularly for promoting adherence of the coating to the insert during molding (it is a question of hot molding).

The insert cooperates with a part intended to seal the proximal end of this insert, which part is provided with means for effecting draining without completely removing the sealing part: for this, the part in question is formed by a threaded tubular plug intended to be screwed inside the previously tapped insert and its lateral wall is provided with a drain orifice formed in the upper part.

The purpose of the present invention is to provide a branch connection, and more particularly a drain branch connection which answers better the requirements of practice than the connections relating to the same purpose known heretofore, particularly:

in that the drain connection of the invention has:
- a better fatigue resistance (and so better sealing behavior),
- a fatigue resistance which is more constant in time (less aging), and in that there is no need to apply bonding material to this connection (insert) before molding, which simplifies the fitting of a drain connection.

SUMMARY OF THE INVENTION

The present invention provides a branch connection, and in particular a drain connection, for a main flexible pipe, reinforced or not, sheathed or not, of the type secured to the main pipe by coating, by molding, an appropriate junction material formed particularly by rubber or similar, and of the type having:

- its distal end preferably separated from or at most in contact with the wall of said main pipe;
- the shape of a tubular insert embedded at least partially in said junction material and cooperating with a part intended to seal off the priximal end of this insert, and
- means for effecting draining without completely removing said part, in which drain connection said tubular insert comprises a plurality of openings formed in its tubular wall so that coating with said junction material which penetrates into these openings during molding forms connection bridges between the portions of said coating which surround the insert, these connecting bridges holding said insert in position In addition to the foregoing arrangements, the invention further comprises other arrangements which will be clear from the following description.

BRIEF DESCRIPTION OF THE DRAWINGS

The invention will be better understood from the complement of description which follows with reference to the accompanying drawings in which:

FIG. 1 is a vertical sectional view showing the drain connection of the invention;

FIGS. 2 and 4 are top views of the tubular insert of the invention illustrated in FIG. 1, which show two particular and non-limitative arrangements of holes for penetration of the junction material used within the scope of the invention, and FIGS. 3 and 5 are sectional views (half sections) along lines III—III and V—V of FIGS. 2 and 4, respectively, showing an advantageous detail relative to these penetration holes.

It should however be understood that these drawings and the corresponding descriptive parts are given solely by way of illustration of the object of the invention of which they in no wise form a limitation.

In FIG. 1, reference 3 designates a main flexible pipe, more particularly reinforced (cf. ref. 3a), in which has been provided a branch orifice 4, in correspondence with which it is desired to fit a drain branch connection.

This latter is formed by a tapped insert which is in particular, but not limitatively, in the form of a nut 1 into which is screwed the threaded central shank 2 of a plug 5 intended to seal the proximal end of nut 1 by bearing, with the lower face 6 of its operating head 7 on the upper portion 8a of the coating material in which this nut 1 is embedded.

The coating 8 completely surrounds nut 1 and its lower portion 8b penetrates into the branch orifice 4 so as to protect the armature by means of a collar 8c and it is applied to the wall of the main pipe 3 defining a sort of coating cone 8 over which said plug 5 is mounted.

In accordance with the invention, in the thickness of nut 1 are formed holes 9 (see also references 9a or 9b in FIGS. 2 to 5): thus the junction material coating 8, which penetrates into these holes during molding, forms connecting bridges 10 (cf. FIG. 1) between said lower and upper portions 8a and 8b of coating 8 which are below and above nut 1, the bridges 10 holding this latter in position.

Preferably, the holes are distributed uniformly all around the branch duct 11 defined by nut 1 and symmetrically with respect to the axis of this duct.

The section of the holes for passage or penetration of the junction material may have any form a priori, but preferably are circular or ovoidal (cf. FIGS. 4 and 2 respectively).

Anyhow, in each case, it is advantageous for the internal wall 14 of these holes to be connected by widened or rounded portions (12) passing from the inside to the outer wall 15 of the insert (cf. FIGS. 3 and 5), which improves the adherence between the insert and the junction material 8.

Although the figures show an insert in the form of a nut, it goes without saying that this configuration is not to be considered as being limitative: in fact, any other configuration may in principle be used without departing from the scope or spirit of the present invention.

Similarly, the number of holes (six in FIGS. 2 and 4) and the section (hexagonal) of the nut are not limitative either, as well as the use of through-holes formed perpendicularly to the thickness of the nut.

In fact, holes may be readily formed whose axis slants for all the holes laterally upwards or downwards, with respect to the axis of the nut, or else slants alternately laterally upwards and downwards when passing from one hole to the adjacent hole.

Channels may further be formed passing through the nut in one plane and/or in two or more planes parallel to the bases of the nut or having any path, these channels being able to replace said holes or being able to cooperate with these holes.

In addition, the junction material may also be formed by a plastic material which is molded about the insert by injection.

Furthermore, although FIG. 1 shows a coating stopping at the wall of the main pipe, it goes without saying that in some cases the coating may, in a way known per se, completely envelope this main pipe (cf. in particular FIG. 1 of the French patient application No. 83 11695), and particularly when its diameter is of the order of size of the diameter of the insert; for obvious reasons of economy of material it is not advantageous to use this arrangement in all cases.

It should be further emphasized that the insert and the plug may be made not only from a metal material, particularly from brass, but preferably from an appropriate plastic material.

There will be further noted the presence of a longitudinal groove 13 (cf. FIG. 1) formed in the surface of the threaded shank 2 of plug 5 which corresponds to an alternative means to that proposed in the French patent application No. 81 10769 for effecting draining without necessarily having to completely unscrew plug 5.

The means for draining without completely removing the part intended to seal the insert are not to be considered as being limitative either, any solution going in the same direction being obviously also valid.

What is important within the scope of the present invention is that the tubular insert—which is embedded in the coating of junction material and which is intended to be sealed by an appropriate plug for effecting draining whenever necessary—has in the thickness of its wall a plurality of holes or channels in which said junction material may penetrate during molding for imprisoning the insert.

Thus, it is advantageously no longer necessary to apply a bonding material to the insert before molding the junction materials, which simplifies the construction of a drain connection by making it more resistant: the fatigue resistance may even be doubled, as has been shown by fatigue tests consisting in subjecting the drain connections formed in accordance with the invention to cyclic pressure variations of predetermined intensity and duration.

Furthermore, the performances of the different drain connections thus obtained are more uniform, which makes the connections of the present invention more reliable.

As is clear from the foregoing, the invention is in no wise limited to those of its embodiments and modes of application which have been described more explicitly; it embraces, on the contrary, all variants thereof which may occur to a technician skilled in the matter, without departing from the scope or spirit of the present invention.

What is claimed is:

1. A branch connection extending from a branch opening in a wall of a main flexible pipe, said branch connection comprising:
    a molded piece of elastomer or plastic having a distal end and a proximal end;
    a branch duct extending from within the branch opening, at said distal end, to said proximal end and adapted to receive a male threaded element at said proximal end, a portion of said branch duct being defined by a tubular threaded insert adapted to threadingly receive said male threaded element, said tubular threaded insert being embedded within said molded piece, said tubular threaded insert defining a plurality of channels through walls of said threaded insert, said elastomer or plastic of said molded piece extending into and through said channels; and
    means for draining without removing said male threaded element.

2. The branch connection of claim 1, wherein a portion of said molded piece surrounding the branch opening extends no further than said wall of said main pipe surrounding said branch opening.

3. The branch connection of claim 1 wherein said channels of said tubular insert extend parallel to a central axis of said branch duct.

4. The branch connection of claim 1, wherein at least some of said channels extend perpendicular to a central axis of said branch duct.

5. The branch connection of claim 1, wherein said channels are slanted with respect to a central axis of said branch duct.

6. The drain connection as claimed in claim 5, wherein all of the channels slant at the same angle and in the same direction.

7. The drain connection as claimed in claim 5, wherein the channels all slant at the same angle but alternately in one direction and in the opposite direction.

8. The drain connection as claimed in claim 1, wherein said plurality of channels includes channels which have at least one curvelinear segment.

9. The drain connection as claimed in claim 1, wherein entrances and exits of said channels are rounded or widened.

10. The drain connection as claimed in claim 1, wherein said channels are distributed uniformly about a central axis of the branch duct.

11. The drain connection as claimed in claim 1, wherein said means for draining without completely removing said male threaded element comprises a drain groove formed on an external surface of said threaded male element and extending parallel to the axis thereof.

* * * * *